Figure 2:
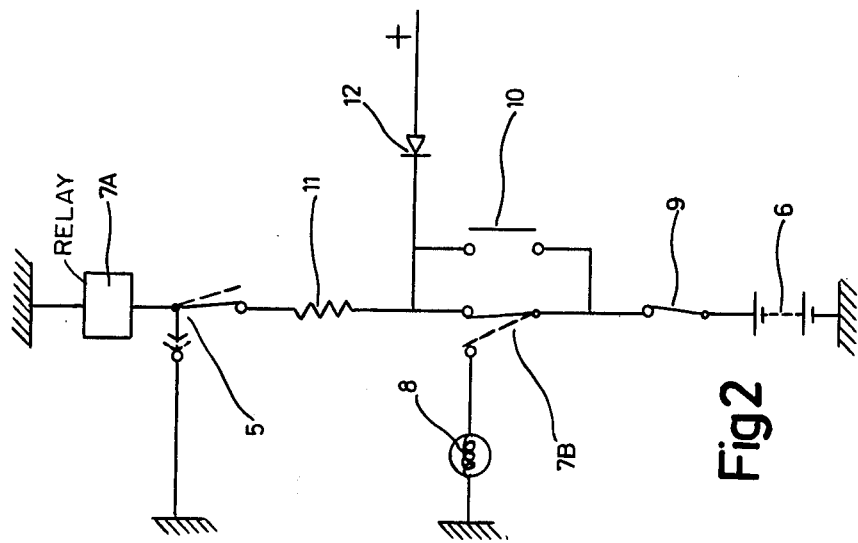

United States Patent [19]
Dahlkvist

[11] 3,902,158
[45] Aug. 26, 1975

[54] ELECTRICAL DEVICE FOR DETECTING OR INDICATING VEHICLE BRAKE LINING WEAR

[75] Inventor: Nils Goran Dahlkvist, Durham, England

[73] Assignee: SAB Brake Regulator Co. Ltd., Durham, England

[22] Filed: Apr. 3, 1974

[21] Appl. No.: 457,419

[30] Foreign Application Priority Data
Apr. 28, 1973  United Kingdom............... 20330/73

[52] U.S. Cl................ 340/52 A; 200/61.4; 188/1 A
[51] Int. Cl.............................................. B60t 17/22
[58] Field of Search......... 340/52 A, 52 B; 188/1 A; 200/61.4, 61.44

[56] References Cited
UNITED STATES PATENTS

| | | |
|---|---|---|
| 3,456,236 | 7/1969 | Labartino et al................. 340/52 A |
| 3,556,258 | 1/1971 | Winge................................. 188/1 A |
| 3,674,114 | 7/1972 | Howard.............................. 188/1 A |
| 3,825,891 | 7/1974 | Kinast................................ 340/52 A |

Primary Examiner—Alvin H. Waring
Attorney, Agent, or Firm—Laurence R. Brown

[57] ABSTRACT

An electric brake lining wear detector comprises a wire loop ruptured by the brake drum as the lining wears past a threshold value and a corresponding detection circuit for developing an alarm signal when the loop is ruptured or the circuit is otherwise faulted such as by shorting to ground. A normally energized actuating relay has one terminal connected to the "earth" battery terminal and the detector switch in the brake lining is coupled in series circuit so that a damaged or earthed detector switch will provide a warning.

4 Claims, 4 Drawing Figures

ELECTRICAL DEVICE FOR DETECTING OR INDICATING VEHICLE BRAKE LINING WEAR

This invention relates to an electrical device for detecting or indicating vehicle brake lining wear suitable particularly although not exclusively for a road vehicle, the device being of the kind (herein called "the kind defined") comprising a normally closed circuit connected to "earth" constituted by the vehicle and comprising at least one voltage source one pole of which is "earthed" to the vehicle, a control means, a switch means controlled by the control means and an activating means which is located at least partially within the brake lining and which activating means is normally electrically "closed" or conductive, said activating means becoming "opened" when the brake lining wear exceeds a predetermined limit and thereby opening said circuit and directly affecting said control means for switching said switch means controlled by said control means to a "warning" position so that an indicator means connected through the switch means to the circuit becomes effective.

It is known to detect excess wear of a vehicle brake lining either by closing a circuit or by opening a circuit at the brake drum or brake disc, and to indicate the circuit alteration to the driver by means of an indicator lamp or a buzzer. It is fundamentally better to obtain the requisite indication by opening of the circuit, as otherwise there will be no brake wear indication if, for example, an electric wire is ripped off or if there is poor contact anywhere in the circuit.

A device of the kind defined employs opening of the circuit to produce the requisite indication.

Partly depending on the fact that electric wires have to extend to the brake linings at the vehicle wheels, where the environment is often very harsh, it is not unlikely that an "earth" connection will occur in an undesired place in the circuit, and this can mean that an opening of the circuit later on and due to excess wear of the brake lining will not be detected. It is thus important to ensure that such a fault will be detected and will not destroy the possibility of proper functioning of the device.

According to the present invention a device of the kind defined is characterised in that the control means is a relay coil connected in the circuit between the activating means and "earth", and the switch means is a relay switch controlled by the relay coil. Thus it is ensured that any improper "earth" connection in the circuit will cause the activating means to be voltage free (just as occurs upon the opening of the activating means due to excessive wear of the brake lining), and the indicator means will indicate this fault in the circuit.

Figure 1:
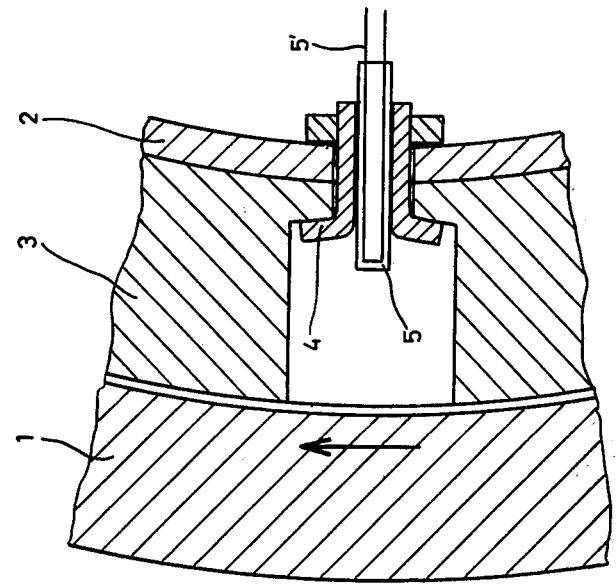
Figure 4:
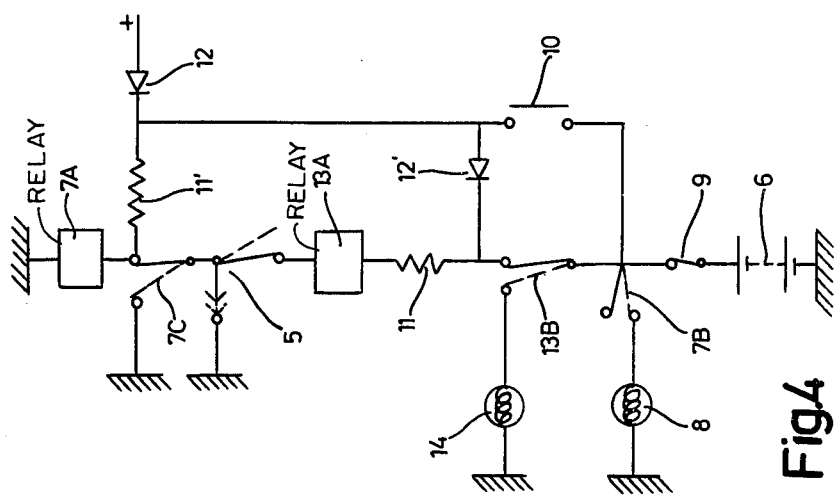
Figure 3:
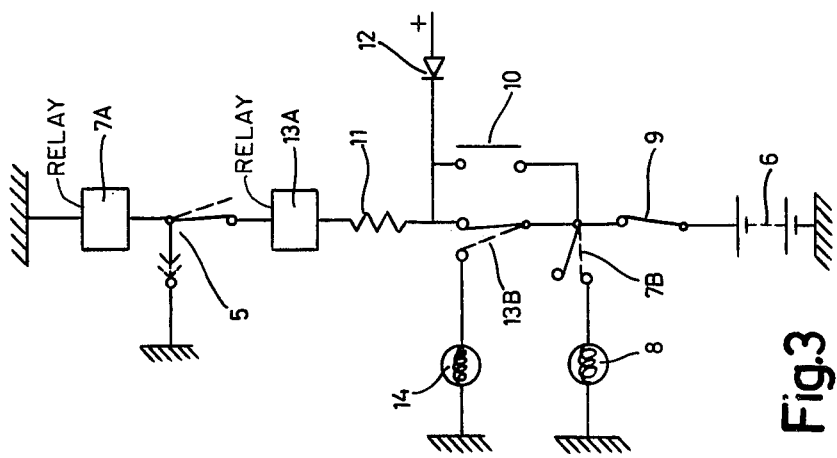

How the invention may be put into practice is described in further detail below with reference to the accompanying drawings, in which FIG. 1 is a sectional view illustrating an activating means with a part of a brake drum and show arrangement, and FIGS. 2-4 are circuit diagrams of three practical circuits for embodiments of the invention.

In FIG. 1 there is shown an activating means with parts of a rotatably mounted brake drum 1 and a non-rotatably mounted brake shoe 2 with a brake lining 3 attached thereto. In a hollow rivet 4 or the like (mounted in the brake shoe 2 and in a recess in the brake lining 3) there is held an activator element 5, for example consisting of a rod of an insulating material with a hairpin-shaped electric wire 5' fixed therein. When the brake lining wear has exceeded a predetermined limit and the brakes are applied the end of the element 5 will begin to wear due to engaging the brake drum 1; the wire 5' will thus be "earthed" against the drum 1 and will eventually be ripped off, causing an opening of a circuit which is described below and of which the wire 5' is a part. An activating means of the kind is known per se and forms no part of the present invention.

In FIG. 2 there is shown a diagram of a circuit for simple devices according to the invention. The electric circuit shown diagrammatically in FIG. 2 (and also in FIGS. 3 and 4) comprises the following main components: a voltage source 6 (here in the form of the vehicle battery or accumulator) of which one pole in usual manner is "earthed" to the vehicle, a relay coil 7A, a relay switch 7B controlled thereby, an indicator lamp 8 (preferably mounted on the vehicle dashboard) and the activator element 5 described above.

The relay coil 7A constitutes a control means, the relay switch 7B a switch means, the indicator lamp 8 an indicator means, and the activating element 5 an activating means. It is, for example, possible to substitute a buzzer in the driver's cab for the lamp 8.

In each circuit there is also an ignition key switch 9, a push-button switch 10, a current-limiting resistor 11, and a diode 12.

As shown in FIG. 2 the relay coil 7A is connected between the element 5 and "earth"; the advantage with this arrangement will be apparent from the description below.

The described device will operate as follows:

When the key switch 9 is turned on for starting the engine, the dashboard warning or indicator lamp 8 will light up, as do all other warning lamps for oil pressure battery-charging etc., thereby giving a check on the lamp 8 itself. (The relay switch 7B is spring-loaded to its "warning" position shown with a dotted line.) When starting the engine reset signal will be received from the starting system through the circuit branch containing the diode 12 and through the resistor 11. If the element 5 is in its normal condition (shown in FIG. 2 with full lines), i.e. with the circuit closed through the wire 5' and no "earth" contact with the drum 1, the relay coil 7A will pull the spring-loaded relay switch 7B to the actuated condition (i.e. the position shown in full line) thereby switching the lamp 8 off and establishing a "hold" current through the relay switch 7B, the resistor 11 and the relay coil 7A. So long as the "hold" current flows the relay switch 7B will remain in this actuated condition (i.e. the position shown in full line) even when the reset signal discontinues.

It is here to be noted that the reference to the element 5 is intended to include several such elements with their wires 5' in series. It is also to be noted that other circuit-opening contacts or switches detecting other conditions in the vehicle can be connected in series with the wire or wires 5' and such contacts or switches are to be included in the expression "activating means". The diode 12 prevents the brake lining wear detector device circuit from affecting the starting system.

Should the activating means open due to excessive brake lining wear, or should the wire 5' make "earth"

contact with the drum 1, the "hold" current will cease and the relay coil 7A will be deenergised, and the spring-loaded relay switch 7B will move to the "warning" position shown by the dotted line and switch on the dashboard warning or indicator lamp 8, which will stay on even if the wire 5' returns to a closed condition or if the "earth" contact thereof discontinues due to the releasing of the brakes.

Obviously a ripped-off connection to the wire 5' (or any of the activating means in series) or any faulty "earth" connection will interrupt the "hold" current so that the lamp 8 is switched on in the same way as above. (In the case of a fault connection to "earth" the resistor 11 will limit the current.)

It is possible to employ the manual reset control in the form of the pushbutton switch 10 to determine whether the warning comes from a temporary "earth" connection, as it will then be possible to reset and switch off the lamp 8 with the brakes released.

The circuitries according to FIGS. 3 and 4 are somewhat more sophisticated than that of FIG. 2. However, the basic components are the same, and the same references indicate the same components in the three embodiments.

The devices according to FIGS. 3 and 4 are thus similar to that according to FIG. 2, but each contains a further relay consisting of a relay coil 13A and a relay switch 13B and also a further dashboard warning or indicator lamp 14. The first lamp 8 may be amber and the second lamp 14 red.

In the embodiment according to FIG. 3 the second relay coil 13A with switch 13B gives the "hold" current, and the red lamp 14 will light and stay alight when the circuit is temporarily or permanently broken. The first relay coil 7A with switch 7B will switch on the amber lamp 8 temporarily during braking, when the element 5 is beginning to wear and the wire 5' is "earthed" against the drum 1, this latter condition, of course, preceding the full wear of the wire 5' with resulting open circuit and red lamp 14 alight for warning of fully worn lining. A permanent fault to "earth" will give a permanently lit amber lamp 8.

The embodiment according to FIG. 4 is similar to that of FIG. 3 except that also the first relay with coil 7A gives a "hold" current by being provided with a second relay switch 7C in addition to the relay switch 7B described above. It appears from FIG. 4 that the circuitry also comprises a second resistor 11' and a second diode 12' whose purpose, of course, is similar to that of the first resistor 11 and the first diode 12.

It is evident that in the embodiment of FIG. 4 also the amber lamp 8 will stay alight after once having been lit due to the occurrence of a temporary "earth" contact with the drum 1 or elsewhere. In this way it is possible to obviate the risk (inherent with the embodiment of FIG. 3) that a temporarily lit amber lamp 8 will not be observed, as the driver does not normally pay attention to the dashboard during braking.

It is obvious that there is no need for any fuses in any of the circuits and that any faults therein will be indicated by the lamp or lamps. It can thus be said that the device is self-checking.

As pointed out above the invention is not limited to the illustrated and described embodiments, but only within the scope of the Claims below.

I claim:

1. An electrical device for indicating the brake lining wear in a vehicle having brake linings and an electrically earthed conductive circuit comprising in combination, a voltage source with one pole connected to said earthed circuit, two terminal electrically operable relay control means having a control circuit, and warning switch means operated by said control means responsive to different electrical conditions in said control circuit to energize said control means in one position as holding means, detection switch means located in said brake lining comprising a normally closed conductive circuit which becomes ruptured and opened in response to brake lining wear exceeding a predetermined limit, a circuit connecting said voltage source temporarily to operate said control means in a first holding condition through said detection switch means with one control means terminal earthed and said detection switch means connected serially with the other terminal to said unearthed voltage source pole, and a warning device operated by said control means through said warning switch means when said detection switch means is opened to release said holding means, whereby any earthing of said detection switch means will cause said control device to operate said warning device.

2. A device as defined in claim 1 wherein the vehicle has an electrical starting system including automatic reset means for said control means comprising a circuit with a diode connected from the starting system to supply voltage to said unearthed terminal of said control means.

3. A device as defined in claim 1, including a further electrically operable relay control means connected between the voltage source and the detection switch, and a further warning device operable by said further control means, whereby one said control means gives warning of temporary brake wear elements as said detection switch becomes earthed before rupture, and the other control means gives warning of an open detection switch.

4. A device as defined in claim 1 wherein the vehicle has an electrical starting system including two separate automatic reset means each comprising a circuit with a diode connected from the starting system to supply voltage to a respective one of said control means.

* * * * *